(12) United States Patent
Fislage et al.

(10) Patent No.: US 8,035,492 B2
(45) Date of Patent: Oct. 11, 2011

(54) DEVICE FOR DETECTING AN INSTALLATION ERROR OF SATELLITE SENSORS ON OPPOSITE SIDES IN A VEHICLE

(75) Inventors: Markus Fislage, Leonberg (DE); Christophe Kolb, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 651 days.

(21) Appl. No.: 11/596,452

(22) PCT Filed: Mar. 4, 2005

(86) PCT No.: PCT/EP2005/050964
§ 371 (c)(1),
(2), (4) Date: Dec. 21, 2007

(87) PCT Pub. No.: WO2005/113297
PCT Pub. Date: Dec. 1, 2005

(65) Prior Publication Data
US 2008/0204202 A1 Aug. 28, 2008

(30) Foreign Application Priority Data
May 19, 2004 (DE) .......................... 10 2004 024 704

(51) Int. Cl.
*B60Q 1/00* (2006.01)
*B60R 25/10* (2006.01)
*B60J 5/00* (2006.01)
*G04F 1/00* (2006.01)
*G06F 11/30* (2006.01)

(52) U.S. Cl. ........... 340/425.5; 340/426.33; 340/426.28; 296/146.4; 702/176; 702/177; 702/178; 702/185

(58) Field of Classification Search ............... 340/425.5, 340/426.13
See application file for complete search history.

(56) References Cited

U.S. PATENT DOCUMENTS

| | | | | |
|---|---|---|---|---|
| 4,922,224 A * | 5/1990 | Drori et al. | ................. | 340/428 |
| 5,682,133 A * | 10/1997 | Johnson et al. | ........... | 340/426.19 |
| 6,040,771 A * | 3/2000 | Kim | ................. | 340/545.1 |
| 6,095,553 A * | 8/2000 | Chou et al. | ................. | 280/735 |
| 6,239,698 B1 * | 5/2001 | Porter et al. | ................. | 340/506 |
| 6,310,549 B1 * | 10/2001 | Loftin et al. | ................. | 340/547 |
| 6,816,069 B2 * | 11/2004 | Quigley | ................. | 340/521 |
| 2001/0045890 A1 * | 11/2001 | Wu | ................. | 340/426 |
| 2003/0160689 A1 * | 8/2003 | Yazdgerdi | ............ | 340/457.1 |
| 2005/0062605 A1 * | 3/2005 | Sutphin | ................. | 340/539.26 |

FOREIGN PATENT DOCUMENTS

| | | |
|---|---|---|
| DE | 100 02 685 | 7/2001 |
| DE | 100 11 635 | 9/2001 |
| DE | 101 44 266 | 4/2003 |

* cited by examiner

*Primary Examiner* — Daniel Wu
*Assistant Examiner* — Pameshanand Mahase
(74) *Attorney, Agent, or Firm* — Kenyon & Kenyon LLP

(57) ABSTRACT

A device for detecting an installation error of satellite sensors on opposite sides of a vehicle is provided, which device detects the installation error based on a signal comparison between a door contact signal and a signal of one of the satellite (door acceleration) sensors during closing of a side door.

20 Claims, 1 Drawing Sheet

DEVICE FOR DETECTING AN INSTALLATION ERROR OF SATELLITE SENSORS ON OPPOSITE SIDES IN A VEHICLE

FIELD OF THE INVENTION

The present invention relates to a device for detecting an installation error of satellite sensors on opposite sides of a vehicle.

BACKGROUND INFORMATION

Detecting an erroneous installation of sensor means in a vehicle is described in, e.g., published German patent document DE 100 02 685. Detection of an installation error takes place by comparing the signals of the sensor means which are converted into yaw angle velocity values. Larger deviations between the values are interpreted as errors and are displayed on a display device.

SUMMARY

The device according to the present invention for detecting an installation error of satellite sensors on opposite sides has the advantage that an installation error of the satellite sensor is detected by comparing a door contact signal and a signal of a satellite sensor. In opposite satellite sensors which are situated in the area of the driver's door and the front passenger's door, for example, the cables may be reversed. It is possible to detect this type of installation error in a simple manner by using the device according to the present invention. If, in the case of a door contact signal, the opposite sensor emits a signal within a predefined period of time, it is clear that there was a mix-up of the cabling of the sensors and the control unit. This may then advantageously be written into a memory or may be displayed.

DETAILED DESCRIPTION

Peripheral acceleration sensors or satellite sensors are installed in the door areas of a vehicle to support the control unit for actuating passenger protection means, to detect a side impact, or to make a plausibility check on the side impact in combination with other impact sensors, for example. In the case of acceleration sensors, the sensor type on the driver's side and the front passenger's side is identical. Therefore, it is not possible for a control unit to differentiate whether the sensor for the driver's door is erroneously connected to the terminal of the front passenger's door, for example. In the worst case scenario this may result in that, in the event of a crash, the wrong side airbag is triggered due to an installation error or if the timing of the triggers of both airbags is not optimal.

According to the present invention, a device is provided for detecting installation errors of satellite sensors situated on opposite sides, which device utilizes a correlation between signals of satellite sensors and door contact signals for this purpose. This arrangement makes it possible to detect reversed sensors; however, the approach may also be implemented with a software. The calculation is simple in this case, since only a simple correlation of limiting value-exceed time to door-closing time need be carried out using a time delta. The device according to the present invention is reliable and also easily verifiable.

Figure 1:
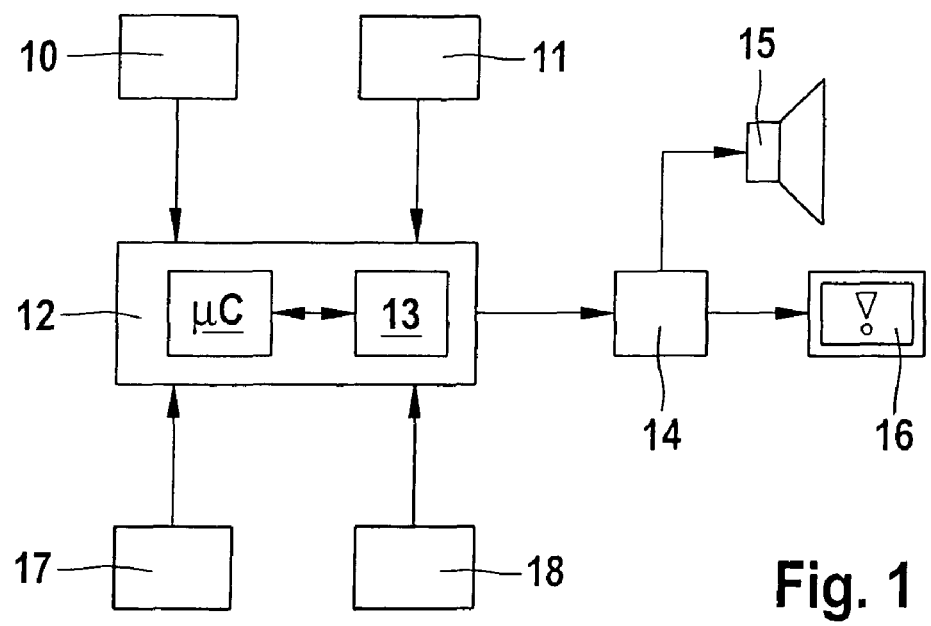
FIG. 1 shows a block diagram of the device according to the present invention.

FIG. 1 shows an example embodiment of the device according to the present invention in a block diagram. Satellite sensors 10 and 17 situated on opposite sides are connected to a control unit 12 for actuating passenger protection means. In addition, sensors, connected to control unit 12, are provided for monitoring door-closing contacts 11 and 18. The signals of these sensors are analyzed by a processor μC in control unit 12. Processor μC uses a memory 13 for this purpose. In addition to the passenger protection means (which are not shown here), control unit 12 also actuates a loudspeaker 15 and a display 16 via an activation unit 14. This makes it possible to issue alerts.

If door-closing contacts 11 and 18 detect that the door has been closed, i.e., the front passenger's and driver's door, the door-closing times are then compared to the signals emitted by sensors 10 and 17. Via the acceleration occurring during door-closing, these sensors 10 and 17 must also detect the door-closing itself. An installation error exists if the door-closing time of sensor 11 correlates with the signal of sensor 17, because the connection of sensor 17 to control unit 12 should be at the point to which sensor 10 is connected, which is therefore also wrongly connected. However, a correct installation of the sensors exists if the door-closing contact signal of sensor 11 correlates with the signal of satellite sensor 10. If, however, there is no signal at all, neither from sensor 10 nor from sensor 17, then sensor errors exist which may also be detected by the device according to the present invention. The signals which occur during door-closing may be measured in the factory in order to provide an appropriate threshold in processor μC in such a way that these door-closing signals, which are detected by sensors 10 and 17, are able to be easily identified.

Figure 2:
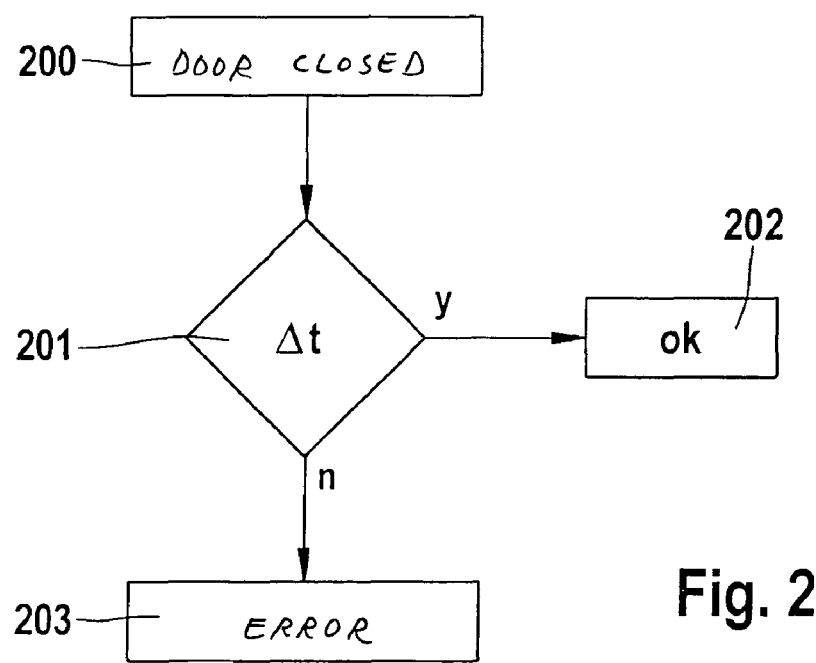
FIG. 2 shows a flow chart illustrating the operation of the device to the present invention.

FIG. 2 shows in a flowchart form an example method which is executed on the device according to the present invention. In method step 200 it is determined via door contact sensors 11 or 18 that a corresponding door is going to be closed. A time marker may be set for this purpose. It is checked in method step 201 whether, within a certain period of time ΔT, corresponding acceleration sensor 10 or 17, which according to the connection to control unit 12 is situated in the proximity or in the door represented by door contact sensor 11 or 18, respectively, also receives an acceleration signal which represents the closing of the door. If this is the case, it is then determined in method step 202 that the installation is correct. It is not necessary to subsequently execute the method according to the present invention, unless it is used for checking the operational reliability of the acceleration sensors. If the acceleration sensors do not respond at all to the closing of the doors, it is very likely that the acceleration sensors are not working. However, if it has been determined in method step 201 that it is not acceleration sensor 10, for example, which is assigned to door contact sensor 11 according to the connection to control unit 12, which emits an acceleration signal which corresponds to the closing of the door associated with door contact sensor 11, but rather acceleration sensor 17 which is supposed to be situated on the opposite side and is therefore not supposed to emit the appropriate signal, then it is concluded in method step 203 that an error exists. This means that an installation error exists which needs to be corrected in the shop. This error may be indicated acoustically and/or visually via loudspeaker 15 or display 16. For this purpose, loudspeaker 15 may be actuated via an audio amplifier 14 or display 16 via activating electronics 14. If no signal appears at all when the door is closed, and if this is determined in method step 301, an error exists here too which is appropriately indicated. The errors are stored in memory 13 of microprocessor μC.

It has been described above that the installation position of acceleration sensors 10 and 17 is tested via control unit 12 for actuating the passenger protection means. It is possible that this test is performed via other control units. It may be provided that door contact sensors 11 and 18 are connected to control unit 12 via a CAN bus. Control unit 12 may have a corresponding CAN controller in this case. Memory 13 has at least one part which allows permanent storage of data so that errors, such as the installation error, may be stored permanently.

What is claimed is:

1. A device for detecting an installation error of a first satellite sensor on a side of a vehicle corresponding to a first door, comprising:
    a detection mechanism for detecting a first door contact signal indicating an imminent closing of the first door;
    a detection mechanism for detecting a second door contact signal indicating an imminent closing of a second door on opposite side of the vehicle from the first door; and
    a control unit for detecting the installation error of the at least one satellite sensor, wherein the installation error is detected based on a comparison between one of the first and second door contact signals and a signal of one of the first satellite sensor and a second satellite sensor on the side of the vehicle corresponding to the second door during closing of one of the first door and the second door.

2. The device as recited in claim 1, wherein the installation error is detected when the signal of one of the first satellite sensor and the second satellite sensor is not present within a predefined period of time after detecting of one of the first and second door contact signals.

3. The device as recited in claim 1, further comprising:
    a memory, wherein information indicating the installation error is stored in the memory after the installation error has been detected.

4. The device as recited in claim 2, further comprising:
    a memory, wherein information indicating the installation error is stored in the memory after the installation error has been detected.

5. The device as recited in claim 1, further comprising:
    an alert mechanism for issuing an alert after the installation error has been detected.

6. The device as recited in claim 2, further comprising:
    an alert mechanism for issuing an alert after the installation error has been detected.

7. The device as recited in claim 1, wherein the installation error is detected when the first door contact signal and the signal of the second satellite sensor are detected within the predefined period of time.

8. The device as recited in claim 1, wherein the installation error includes reversed cables between a driver's door and a front passenger's door.

9. The device as recited in claim 1, wherein no installation error exists if the signal between one of the first door contact signals correlates with a signal of one of the first satellite sensor and the signal between one of the second door contact signals correlates with a signal of one of the second satellite sensor.

10. The device as recited in claim 1, wherein the control unit and the contact sensors are connected via a CAN bus.

11. The device as recited in claim 3, wherein the installation error is stored in the memory permanently.

12. The device as recited in claim 1, further comprising:
    a memory wherein information indicating the installation error is stored in the memory after the installation error has been detected; and
    an alert mechanism for issuing an alert after the installation error has been detected, wherein the installation error is detected when the first door contact signal and the signal of the second satellite sensor are detected within the predefined period of time.

13. A method for detecting an installation error of a first satellite sensor on a side of a vehicle corresponding to a first door, comprising:
    detecting a first door contact signal indicating an imminent closing of the first door;
    detecting a second door contact signal indicating an imminent closing of a second door on opposite side of the vehicle from the first door; and
    detecting the installation error of the at least one satellite sensor, wherein the installation error is detected based on a comparison between one of the first and second door contact signals and a signal of one of the first satellite sensor and a second satellite sensor on the side of the vehicle corresponding to the second door during closing of one of the first door and the second door.

14. The method of claim 13, further comprising:
    storing the installation error in a memory after the installation error has been detected; and
    issuing an alert after the installation error has been detected, wherein the installation error is detected when the first door contact signal and the signal of the second satellite sensor are detected within the predefined period of time.

15. The device as recited in claim 1, further comprising:
    a memory, wherein information indicating the installation error is stored in the memory after the installation error has been detected;
    wherein the installation error is detected when the signal of one of the first satellite sensor and the second satellite sensor is not present within a predefined period of time after detecting of one of the first and second door contact signals, and
    wherein no installation error exists if the signal between one of the first door contact signals correlates with a signal of one of the first satellite sensor and the signal between one of the second door contact signals correlates with a signal of one of the second satellite sensor.

16. The device as recited in claim 1, further comprising:
    a memory, wherein information indicating the installation error is stored in the memory after the installation error has been detected; and
    an alert mechanism for issuing an alert after the installation error has been detected;
    wherein the installation error includes reversed cables between a driver's door and a front passenger's door.

17. The device as recited in claim 16, wherein no installation error exists if the signal between one of the first door contact signals correlates with a signal of one of the first satellite sensor and the signal between one of the second door contact signals correlates with a signal of one of the second satellite sensor.

18. The device as recited in claim 1, further comprising:
an alert mechanism for issuing an alert after the installation error has been detected;
wherein the installation error is detected when the first door contact signal and the signal of the second satellite sensor are detected within the predefined period of time, and
wherein the installation error includes reversed cables between a driver's door and a front passenger's door.

19. The device as recited in claim 18, wherein no installation error exists if the signal between one of the first door contact signals correlates with a signal of one of the first satellite sensor and the signal between one of the second door contact signals correlates with a signal of one of the second satellite sensor.

20. The device as recited in claim 1, further comprising:
a memory, wherein information indicating the installation error is stored in the memory after the installation error has been detected;
an alert mechanism for issuing an alert after the installation error has been detected;
wherein the installation error is detected when the first door contact signal and the signal of the second satellite sensor are detected within the predefined period of time,
wherein the control unit and the contact sensors are connected via a CAN bus, and
wherein the installation error is stored in the memory permanently.

* * * * *